US010000190B2

(12) United States Patent
Katahira et al.

(10) Patent No.: US 10,000,190 B2
(45) Date of Patent: Jun. 19, 2018

(54) COOLING DEVICE, AND STEERING BOGIE AND VEHICLE PROVIDED WITH SAME

(71) Applicant: MITSUBISHI HEAVY INDUSTRIES, LTD., Tokyo (JP)

(72) Inventors: Kousuke Katahira, Tokyo (JP); So Tamura, Tokyo (JP); Mitsuaki Hoshi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 43 days.

(21) Appl. No.: 15/030,528

(22) PCT Filed: Jul. 23, 2014

(86) PCT No.: PCT/JP2014/069439
§ 371 (c)(1),
(2) Date: Apr. 19, 2016

(87) PCT Pub. No.: WO2015/075968
PCT Pub. Date: May 28, 2015

(65) Prior Publication Data
US 2016/0251002 A1 Sep. 1, 2016

(30) Foreign Application Priority Data
Nov. 20, 2013 (JP) .................. 2013-240385

(51) Int. Cl.
*B61H 5/00* (2006.01)
*B60T 5/00* (2006.01)
(Continued)

(52) U.S. Cl.
CPC ............... *B60T 5/00* (2013.01); *B61B 13/00* (2013.01); *B61D 1/00* (2013.01); *B61F 5/38* (2013.01);
(Continued)

(58) Field of Classification Search
CPC .... B60T 5/00; B61H 1/00; B61D 1/00; B61F 5/52; B61F 5/38; B61B 13/00; F16D 65/847
(Continued)

(56) References Cited

U.S. PATENT DOCUMENTS 3,168,348 A 2/1965 Fleming et al.
3,314,509 A * 4/1967 Pelikan .................. F16D 65/124
188/218 XL
(Continued)

FOREIGN PATENT DOCUMENTS

JP S58-005602 Y2 1/1983
JP S58-053251 Y2 12/1983
(Continued)

OTHER PUBLICATIONS

English Translation of JP 2006-306116 obtained on website https://worldwide.espacenet.com/ on Oct. 24, 2017.*
(Continued)

*Primary Examiner* — Pamela Rodriguez
(74) *Attorney, Agent, or Firm* — Manabu Kanesaka; Benjamin Hauptman; Kenneth Berner

(57) ABSTRACT

A cooling device provided with cooling fins which: is provided in a wheel of a running wheel which integrally rotates with a axle shaft and has a brake device positioned in the interior thereof; and produces, by rotating in both the forward and reverse directions of the wheel, airflow which flows through the brake device via ventilation holes passing from the inside to the outside of the wheel. Therein, the cooling fins produce an airflow which flows through a plurality of decorative holes serving as the ventilation holes and formed in the wheel along the circumference centered around the rotational axis of the axle shaft.

12 Claims, 9 Drawing Sheets

(51) Int. Cl.
  *B61B 13/00* (2006.01)
  *F16D 65/847* (2006.01)
  *B61D 1/00* (2006.01)
  *B61F 5/38* (2006.01)
  *B61F 5/52* (2006.01)
  *B61H 1/00* (2006.01)

(52) U.S. Cl.
  CPC .................. *B61F 5/52* (2013.01); *B61H 1/00* (2013.01); *F16D 65/847* (2013.01)

(58) Field of Classification Search
  USPC ..... 188/264 A, 264 AA, 3 R, 33, 34, 35, 38, 188/41, 218 XL; 105/177, 182.1, 25.1
  See application file for complete search history.

(56) References Cited

U.S. PATENT DOCUMENTS 3,472,345 A * 10/1969 Dean .................... F16D 65/128
  188/264 A
8,794,398 B2 * 8/2014 Fujimoto ................ B61H 5/00
  188/218 XL
2012/0097065 A1 * 4/2012 Maeyama .............. B62D 1/265
  105/177

FOREIGN PATENT DOCUMENTS

| | | |
|---|---|---|
| JP | S58-058241 B2 | 12/1983 |
| JP | H01-059702 U | 4/1989 |
| JP | H04-103401 A | 4/1992 |
| JP | H05-016603 A | 1/1993 |
| JP | 2006-306116 A | 11/2006 |
| JP | 2010-188971 A | 9/2010 |

OTHER PUBLICATIONS

PCT/ISA/210, "International Search Report for International Application No. PCT/JP2014/069439," dated Oct. 7, 2014.

PCT/ISA/237, "Written Opinion of the International Searching Authority for International Application No. PCT/JP2014/069439," dated Oct. 7, 2014.

* cited by examiner

# COOLING DEVICE, AND STEERING BOGIE AND VEHICLE PROVIDED WITH SAME

TECHNICAL FIELD

The present invention relates to a cooling device that cools a brake device provided in a vehicle, and a steering bogie and a vehicle provided with the same.

Priority is claimed on Japanese Patent Application No. 2013-240385, filed Nov. 20, 2013, the content of which is incorporated herein by reference.

BACKGROUND ART

As new transportation means other than buses or railroads, track-based transportation systems that travel on a track by means of steering bogies provided with running wheels of rubber tires are known. Such track-based transportation systems are generally referred to as new transportation systems or automated people movers (APMs).

Here, a brake device, such as a disc brake or a drum brake, is provided in a steering bogie of a vehicle in the track-based transportation systems. The brake device is housed inside a rim of a wheel in a running wheel. For this reason, there is a problem in that it is difficult to radiate the heat generated when using the brake device to the outside and brake performance degrades.

Here, a heat dissipation structure in which a fan that rotates together with the rotation of the wheel is provided inside a rim of a wheel provided in buses, autotrucks, or the like, and air is forcedly sent to the inside of the rim so as to cool a brake device is described in PTL 1.

CITATION LIST

Patent Literature

[PTL 1] Japanese Examined Utility Model Registration Application Publication No. 58-53251

SUMMARY OF INVENTION

Technical Problem

However, in buses or autotrucks, a traveling direction is basically one direction. However, vehicles of the new transportation systems run after the traveling direction thereof is changed forward and rearward. Since the heat dissipation structure described in PTL 1 is one provided in buses or autotrucks, air is sent to the inside of the rim by the rotation of the wheel when a vehicle travels forward. Thus, the above heat dissipation structure is not a structure in which it is assumed that a vehicle travels rearward. For this reason, even if this structure is simply applied to the vehicles of the track-based transportation systems, the brake device provided inside the rim of the wheel cannot be cooled sufficiently.

An object of the invention is to provide a cooling device that can cool a brake device housed in a wheel irrespective of a traveling direction, to maintain brake performance, and a steering bogie and a vehicle provided with the same.

Solution to Problem

According to a cooling device of a first aspect of the invention, the cooling device includes a cooling fin that is provided in a wheel of a running wheel having a brake device disposed therein and rotating integrally with a axle shaft and produces an airflow passing through the brake device through a ventilation hole for allowing the inside and outside of the wheel to communicate with each other by the rotation of the wheel in both forward and reverse directions.

In such a cooling device, regardless of the direction the running wheel rotates, it is possible to produce the airflow passing through the brake device inside the wheel by means of the cooling fin. Therefore, in the vehicle provided with such a running wheel, the brake device can be cooled even in a case where the vehicle travels after the traveling direction thereof is changed forward and rearward.

Additionally, in the cooling device related to a second aspect of the invention, the cooling fin in the first aspect may produce the airflow through a plurality of decorative holes that serve as the ventilation hole and are formed on the circumference centered on a rotational axis of the axle shaft in the wheel.

The airflow resulting from the cooling fin can be produced through the decorative holes formed in the wheel for the purpose of weight reduction and the ventilation between the inside and outside of the wheel. Hence, it becomes unnecessary to newly form a ventilation hole for allowing the inside and outside of wheel to communicate with each other in order to produce the airflow that faces the inside and outside of the wheel. As a result, costs for newly forming the ventilation hole can be reduced.

Moreover, in the cooling device related to a third aspect of the invention, the cooling fin in the first or second aspect may produce the airflow in a direction along the rotational axis of the axle shaft.

By producing the airflow in the direction along the rotational axis in this way, the airflow can be directly blown to the brake device, and the cooling effect of the brake device can be improved. Additionally, by virtue of such an airflow, the airflow after the heat generated from the brake device is recovered is rapidly circulated in a direction apart from the wheel, and efficient heat exhaust becomes possible.

Additionally, in the cooling device related to a fourth aspect of the invention, the cooling fin in any one of the first to third aspects may further include a plate-like member that is provided at an end apart from the axle shaft, in a wheel hub that fixes the axle shaft and the wheel, and rotates together with the axle shaft, and the cooling fin may be formed in the plate-like member.

By attaching such a plate-like member to the wheel hub provided in the wheel, the cooling fin that produces the airflow passing through the brake device can be installed easily.

Moreover, in the cooling device related to a fifth aspect of the invention, a plurality of the cooling fins in the fourth aspect may be formed on the circumference centered on the rotational axis of the axle shaft on the plate-like member, and each of the cooling fins may extend so as to be inclined toward one side in a circumferential direction of the rotational axis as it becomes closer to a side apart from the axle shaft in the direction of the rotational axis from on the plate-like member, and a through-hole passing through the plate-like member may be formed in a region on the plate-like member corresponding to a region where the cooling fin is provided on a side toward which the cooling fin is inclined.

In this way, as each cooling fin extends so as to be inclined toward one side in the circumferential direction of the rotational axis, an airflow that faces the inside of the wheel from the outside thereof is produced in a case where the rotational direction of the wheel coincides with one side in the circumferential direction, that is, in a case where the wheel rotates in the direction in which the cooling fin extends.

On the other hand, an airflow that faces the outside of the wheel from the inside thereof is produced in a case where the rotational direction of the wheel coincides with the other side in the circumferential direction, that is, in a case where the wheel rotates in a direction opposite to the direction in which the cooling fin extends. Therefore, even in a case where the rotational direction of the wheel is any of the forward and reverse directions, it is possible to produce the airflow passing through the brake device.

Additionally, the cooling device related to a sixth aspect of the invention may further include a wind guide member that is provided in the wheel in any one of the first to fifth aspects, rotates integrally with the wheel, and guides the airflow from the cooling fin, to the ventilation hole.

By virtue of such a wind guide member, when the airflow that faces the inside of the wheel from the outside thereof is produced by the cooling fin, the airflow can be guided so as not to become a flow that faces the outside of the wheel before the airflow in the wheel is guided to the brake device. Additionally, when the airflow that faces the outside of the wheel from the inside thereof is produced by the cooling fin, the brake device can be cooled by the airflow, and the air can be passed through the wheel from the inside of the wheel to the outside thereof. Therefore, cooling of the entire running wheel becomes possible. Therefore, efficient cooling of the brake device and the running wheel becomes possible by virtue of the airflow resulting from the cooling fin.

Moreover, in the cooling device related to a seventh aspect of the invention, the wind guide member in the sixth aspect may have a tubular shape that covers the ventilation hole from an outer side in a radial direction of the rotational axis of the axle shaft and is centered on the rotational axis.

By virtue of the wind guide member having such a tubular shape, the wind guide member can be easily installed in the wheel to guide an airflow to the ventilation hole, and the brake device can be efficiently cooled by the airflow produced by the cooling fin.

Additionally, in the cooling device related to an eighth aspect of the invention, the wind guide member in the seventh aspect may include a body part having a tubular shape centered on the rotational axis of the axle shaft, and a wind guide member fin that extends so as to be inclined toward one side in the circumferential direction of the rotational axis as it becomes closer to an outer side in the radial direction of the rotational axis of the axle shaft from an outer peripheral surface of the body part, and a through-hole passing through the body part may be formed in a region on the outer peripheral surface of the body part corresponding to a region where the wind guide member fin is provided on a side toward which the wind guide member fin is inclined.

In this way, as each wind guide member fin extends so as to be inclined toward one side in the circumferential direction of the rotational axis, the airflow that faces the radial direction of the rotational axis from the outside of the wheel to the inside thereof is produced in a case where the rotational direction of the wheel coincides with one side in the circumferential direction, that is, in a case where the wheel rotates in the direction in which the wind guide member fin extends. On the other hand, an airflow that faces the radial direction of the rotational axis from the inside of the wheel to the outside thereof is produced in a case where the rotational direction of the wheel coincides with the other side in the circumferential direction, that is, in a case where the wheel rotates in a direction opposite to the direction in which the wind guide member fin extends. Therefore, even in a case where the rotational direction of the wheel is any of forward and reverse directions, not only can the airflow resulting from the cooling fin be guided by the body part, but also more airflow can be made to pass through the brake device by generating the airflow in the radial direction with the wind guide member fin. Therefore, more efficient cooling of the brake device becomes possible.

Moreover, in the cooling device related to a ninth aspect of the invention, the wind guide member in the sixth aspect may have a tubular shape that surrounds an opening of the ventilation hole from an outer peripheral side thereof.

In this way, by using a tubular member that surrounds the opening of the ventilation hole from the outer peripheral side thereof as the wind guide member, the cross-sectional area of a flow passage for the airflow that flows through the wind guide member can be made small. Therefore, the flow speed of the airflow that flows through the wind guide member becomes large, and consequently, the heat dissipation effect obtained by the airflow passing through the brake device can be improved.

Moreover, in the cooling device related to a tenth aspect of the invention, a rubber member may be provided between the wind guide member in any one of the sixth to ninth aspects and the wheel located at an end of the wind guide member in the direction of the rotational axis.

By virtue of such a rubber member, in a case where the wind guide member is provided separately from the wheel, the adhesion between the wheel and the wind guide member can be enhanced, and slip-out of the wind guide member from the wheel can be restricted.

Additionally, leakage of the airflow between the wind guide member and the wheel can be suppressed by filling a gap between the wind guide member and the wheel, and more airflow can be sent to the brake device.

Additionally, a steering bogie related to an eleventh aspect of the invention includes a axle shaft that rotates with a rotational axis as a center; a pair of left and right of running wheels each having a wheel and rotating integrally with the axle shaft; a steering guide device that supports the pair of running wheels and is guided by a guide rail extending along a track; and the cooling device in any one of the first to tenth aspects provided in the wheel.

According to such a steering bogie, the cooling device is included. Accordingly, regardless of the direction the running wheel rotates, it is possible to produce the airflow passing through the brake device inside the wheel by means of the cooling fin. Therefore, the brake device can be cooled even in a case where the steering bogie travels after the traveling direction thereof is changed forward and rearward.

Moreover, in the steering bogie related to a twelfth aspect of the invention, the cooling fins may be provided in the cooling devices provided in the respective wheels in the pair of running wheels related to the eleventh aspect so as to produce airflows that face the axle shaft from the wheel in both the cooling devices or produce airflows that face the wheel from the axle shaft in both the cooling devices.

In this way, the airflows produced by the cooling fins in the wheels of the pair of left and right running wheels flow so as to approach each other or so as to separate from each other. As a result, the forces of the airflows produced in the pair of left and right wheels can be cancelled off each other, and thus, the influence of the airflows on the traveling of the steering bogies can be reduced.

Additionally, in the steering bogie related to a thirteenth aspect, the cooling fins may be provided in the cooling devices provided in the respective wheels in the pair of running wheels related to the eleventh aspect so as to produce airflows that faces one side in the direction of the rotational axis of the axle shaft in both the cooling devices.

In this way, the airflows produced by the cooling fins in the wheels of the pair of left and right running wheels flow in the same direction. Therefore, the air flows produced in the pair of left and right running wheels can be kept from interfering with each other, and the airflows smoothly passing through the brake devices can be produced.

Moreover, a vehicle related to a fourteenth aspect of the invention includes a car body having a space formed therein; and the steering bogie of any one of the eleventh to thirteenth aspects that is provided in a lower part of the car body.

According to such a vehicle, the steering bogie including the cooling device is included. Accordingly, regardless of the direction the running wheel rotates, it is possible to produce the airflow passing through the brake device inside the wheel by means of the cooling fin. Therefore, the brake device can be cooled even in a case where the vehicle travels after the traveling direction thereof is changed forward and rearward.

Advantageous Effects of Invention

According to the above cooling device, steering bogie, and vehicle, it is possible to cool the brake device housed in the wheel with the cooling fins of the cooling device irrespective of the traveling direction to maintain brake performance.

DESCRIPTION OF EMBODIMENTS

First Embodiment

Figure 1:
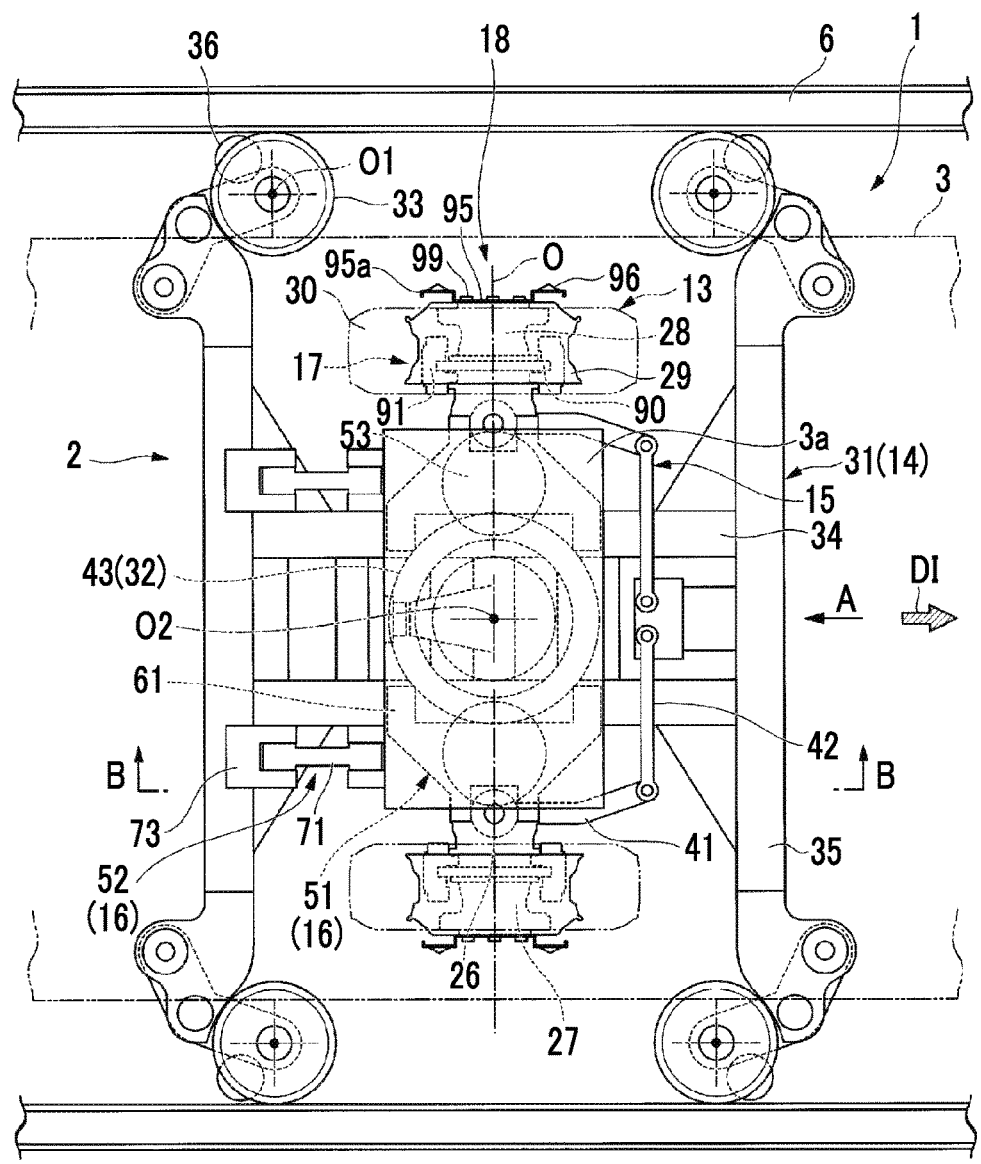
FIG. 1 is a plan view illustrating an aspect in which a vehicle related to a first embodiment of the invention travels on a linear portion of a track.

Hereinafter, a vehicle 1 related to a first embodiment of the invention will be described in detail referring to the drawings.

Figure 2:
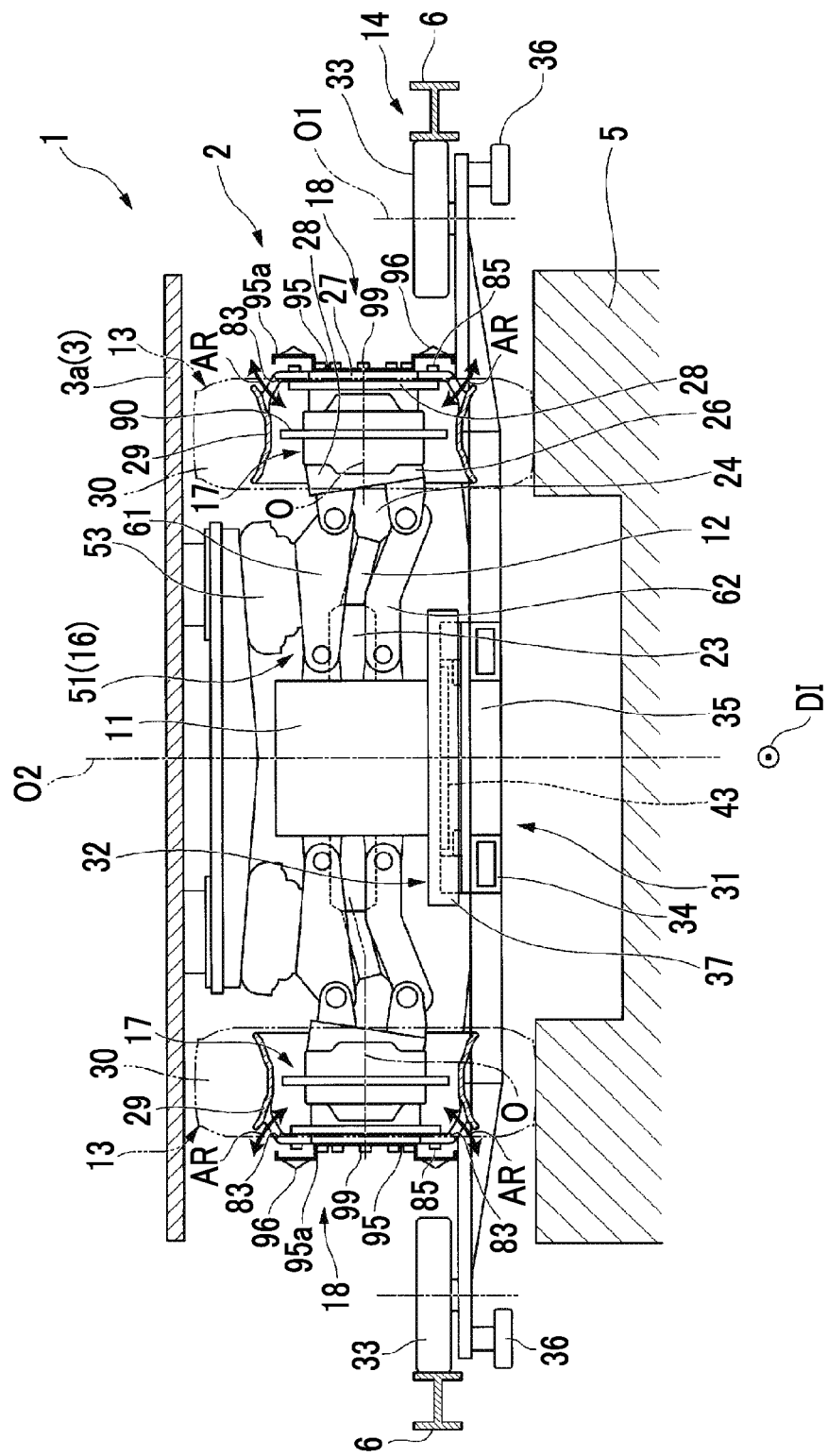
FIG. 2 is a front view illustrating a steering bogie of the vehicle related to the first embodiment of the invention, and is a view as seen in the direction of arrow A of FIG. 1.
Figure 3:
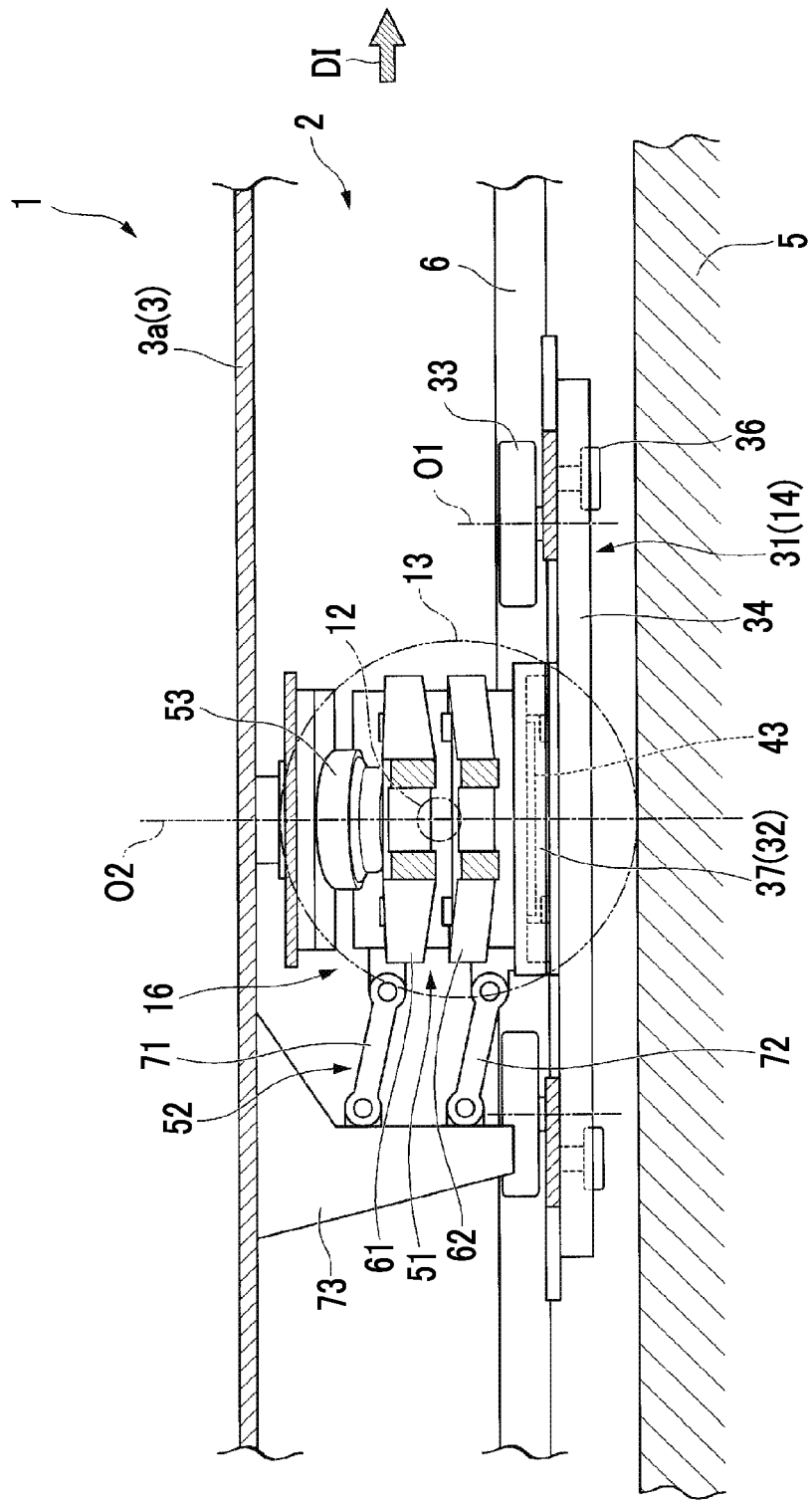
FIG. 3 is a sectional view illustrating the steering bogie of the vehicle related to the first embodiment of the invention, and is a view illustrating section B-B of FIG. 1.

As illustrated in FIGS. 1 to 3, the vehicle 1 is a vehicle of a track-based transportation system that travels on a track 5 while being guided by guide rails 6 provided at the track 5. In the present embodiment, the vehicle 1 is a vehicle of a side guide rail type (side guide type) transportation system in which the guide rails 6 extending in an extending direction of the track 5 are provided on both sides of the track 5 in a width direction.

<Vehicle>

The vehicle 1 includes steering bogies 2 that travel on the track 5, and a car body 3 (refer to FIG. 1) that is supported by the steering bogies 2.

Directions, such as the front, the rear, the top, the bottom, the left, and the right, in the following description are the same as the directions of the vehicle 1 unless particularly mentioned. Additionally, in the following, a direction of arrow DI in a forward-rearward direction of the vehicle 1 is referred to as the front, and a direction opposite to the direction of arrow DI is referred to as the rear. Moreover, a direction toward a subframe 11 (to be described below) arranged at a central part of each steering bogie 2 in a width direction that is a leftward-rightward direction, is referred to as an inner side in the width direction, and a direction away from the subframe 11 is referred to as an outer side in the width direction.

As illustrated in FIG. 1, the car body 3 has a rectangular parallelepiped shape that is long in the forward-rearward direction, and a space capable of accommodating passengers is formed inside the car body. A pair of the above-described steering bogies 2 are provided on the front and rear of a lower part of the car body 3 (not illustrated). Here, since a steering bogie 2 on the front side and a steering bogie 2 on the rear side have the same configuration except that the forward and rearward directions are reversed, one steering bogie 2 (on the front side) will be representatively described below.

<Steering Bogie>

As illustrated in FIGS. 1 to 5B, the steering bogie 2 includes the subframe 11 that is disposed at a central part in the width direction, a pair of left and right axle shafts 12 (refer to FIG. 2) that is rotatably supported by the subframe 11, and running wheels 13 that are respectively coupled to the axle shafts 12.

The steering bogie 2 includes a steering guide device 14 that is guided by guide rails 6, a steering mechanism 15 (refer to FIG. 1) that steers the running wheels 13 according to the displacement of the steering guide device 14, and a suspension device 16 that is arranged between the underframe 3*a* of the car body 3 and the running wheels 13.

The steering bogie 2 includes a brake device 17 that is provided in each running wheel 13, and a cooling device 18 that cools the brake device 17.

A speed reducing mechanism (not illustrated), such as a differential gear for transmitting the rotational power from a driving source, such as a motor (not illustrated), to the axle shafts 12, is housed inside the subframe 11.

As illustrated in FIG. 2, each axle shaft 12 extends in the width direction, and an end thereof on the inner side in the width direction is coupled to the speed reducing mechanism within the subframe 11 via a swingable joint 23. That is, the rotational power transmitted from the driving source via the speed reducing mechanism is distributed to the axle shafts 12, and each axle shaft 12 rotates with a rotational axis O as a center.

An end of each axle shaft 12 on the outer side in the width direction is coupled to an axle hub 27 to which the running wheel 13 is attached via a swingable joint 24. The axle hub 27 rotates together with the axle shaft 12 with the rotational axis O as a center. Each axle hub 27 is rockable around a kingpin 26 (refer to FIG. 1) extending in an upward-downward direction.

That is, the kingpin 26 has a function as a steering shaft of the running wheel 13.

(Suspension Device)

As illustrated in FIG. 2, the suspension device 16 includes a primary suspension mechanism 51 that supports the above-described respective running wheels 13 so as to be displaceable independently in the upward-downward direction with respect to the subframe 11, a secondary suspension mechanism 52 (refer to FIG. 3) that supports the subframe 11 so as to be displaceable in the upward-downward direction with respect to the underframe 3*a*, and a pair of left and right air springs 53 that are arranged between the above-described underframe 3*a* and the primary suspension mechanism 51.

The primary suspension mechanism 51 is an independent suspension mechanism of a so-called double wishbone type. The primary suspension mechanism 51 includes a pair of left and right upper arms 61 and a pair of left and right lower arms 62 extending in the width direction.

Each upper arm 61 is formed in an H shape in a plan view as seen from above, and both ends thereof in the width direction are respectively bifurcated with respect to a central part thereof. An inner end of the upper arm 61 in the width direction is pin-coupled to the subframe 11, and an outer end thereof is pin-coupled to the above-described kingpin 26.

Each lower arm 62 is formed in an H shape in a plan view as seen from above, and both ends thereof in the width direction are respectively bifurcated with respect to a central part thereof. An inner end of the lower arm 62 in the width direction is pin-coupled to the subframe 11 below the upper arm 61, and an outer end thereof is pin-coupled to the above-described kingpin 26 below the upper arm 61.

When the running wheels 13 are displaced in the upward-downward direction due to irregularities of the track 5, the primary suspension mechanism 51 is made rockable in the upward-downward direction with respect to the running wheels 13 and the subframe 11.

As illustrated in FIG. 3, the secondary suspension mechanism 52 is a so-called parallel link mechanism, and includes a pair of left and right upper links 71 and a pair of left and right lower links 72 extending parallel to each other.

Each upper link 71 and each lower link 72 extend so as to be inclined upward as they become closer to the rear, and are respectively pin-coupled to a suspension frame 73 of which a rear end extends downward from the underframe 3*a*. Meanwhile, front ends of the upper link 71 and the lower link 72 are pin-coupled to a rear end of the subframe 11.

The secondary suspension mechanism 52 is made rockable in the upward-downward direction with respect to the suspension frame 73 and the subframe 11, according to the relative movement of the suspension frame 73 and the subframe 11 in the upward-downward direction. The secondary suspension mechanism 52 also has a function as a traction rod for transmitting the driving force or braking force of the running wheels 13 to the car body 3.

Each air spring 53 has an upper end attached to the underframe 3*a* and has a lower end separately attached to an upper surface of each upper arm 61. The air springs 53 relax the relative vertical vibration of the running wheels 13 with respect to the car body 3.

(Steering Guide Device)

The steering guide device 14 includes a guide frame 31, a guide-frame support mechanism 32 for coupling the guide frame 31 to the subframe 11, and guide wheels 33 that are rotatably supported by the guide frame 31.

The guide frame 31 is incorporated in the shape of parallel crosses in a plane view as seen from the upward-downward direction, and is arranged below the subframe 11. Specifically, the guide frame 31 includes a pair of left and right of longitudinal beams 34 extending in the forward-rearward direction, and a pair of cross beams 35 that are coupled to both ends of the longitudinal beams 34 in the forward-rearward direction and extend in the width direction.

Both ends of each longitudinal beam 34 in the forward-rearward direction are located outside each running wheel 13 in the width direction, and have the cross beams 35 coupled thereto, respectively, outside the running wheel 13 in the width direction.

Both ends of each cross beam 35 in the width direction are located outside each running wheel 13 in the width direction, and are arranged so as to sandwich the running wheel 13 from both sides in the forward-rearward direction. The guide wheels 33 are attached to both ends of each cross beam 35 in the rightward width direction one by one.

Each guide wheel 33 is supported so as to be rotatable around a rotation axis O1 extending in the upward-downward direction, and rolls as a result of contact with each guide rail 6.

In the guide frame 31, a branch guide wheel 36 is provided below the guide wheel 33, rolls in contact with the branch guide rail (not illustrated) provided at the track 5, at a branching portion in the track 5, and guides the vehicle 1 in a branch direction.

As illustrated in FIGS. 2 and 3, the guide-frame support mechanism 32 is arranged below the subframe 11. An outer end of the guide-frame support mechanism 32 in the width direction is located further to the inner side in the width direction than an outer end of the primary suspension mechanism 51 (each arm 61 or 62) in the width direction. The guide-frame support mechanism 32 has a turning bearing 43. The turning bearing 43 supports the guide frame 31 so as to be turnable with respect to the subframe 11 around a turning axis O2 extending in the upward-downward direction.

Specifically, the turning bearing 43 is constituted of an outer ring and an inner ring, either the outer ring or the inner ring is fixed to the guide-frame support mechanism 32, and the other ring is fixed to the guide frame 31. In the illustrated example, the turning axis O2 is located at a central part of the guide frame 31 in the forward-rearward direction and the leftward-rightward direction.

(Steering Mechanism)

As illustrated in FIG. 1, the steering mechanism 15 changes the steering angle of the running wheels 13 in an interlocking manner with the turning of the guide frame 31 around the turning axis O2. The steering mechanism 15 has a steering arm 41 that rocks integrally with each running wheel 13 (axle hub 27) on the basis of each kingpin 26, and a steering rod 42 that separately couples each steering arm 41 to the guide frame 31.

The steering rod 42 extends in the width direction. An outer end of the steering rod 42 in the width direction is pin-coupled to a front end of the steering arm 41, and an inner end thereof in the width direction is pin-coupled to the guide frame 31.

(Running Wheel)

Each running wheel 13 is a single tire attached to the axle shaft 12 via each respective axle hub 27 one by one. The running wheel 13 has a wheel 29 that has a bottomed tubular shape attached to the axle hub 27, and a rubber tire 30 that covers the wheel 29.

As the rubber tire 30, for example, a core type tire that has a core housed therein may be used, or a tire with no core used for general autotrucks, general buses, or the like may be used.

Figure 4A:
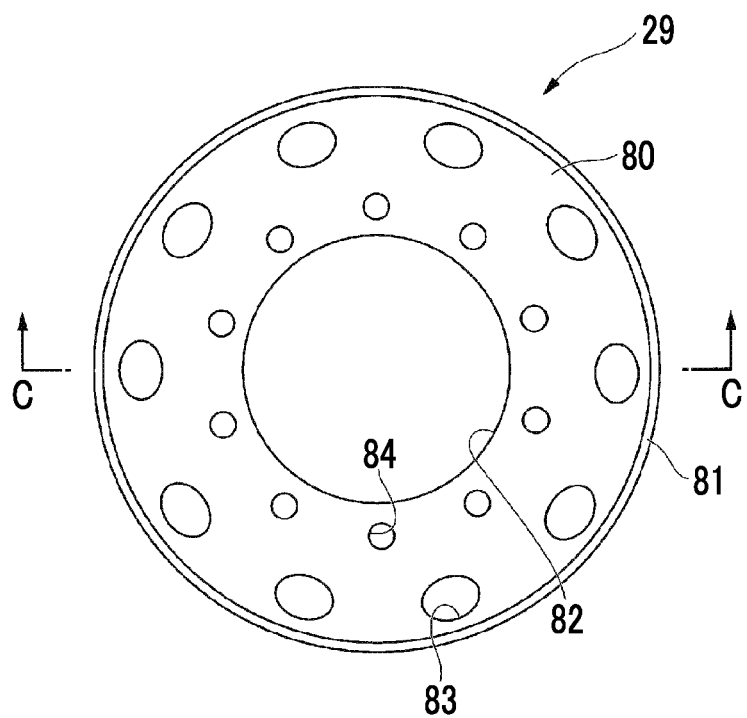
FIG. 4A is a view illustrating a wheel in the vehicle related to the first embodiment of the invention, and is a view as seen from an outer side in a width direction in a direction of a rotational axis.
Figure 4B:
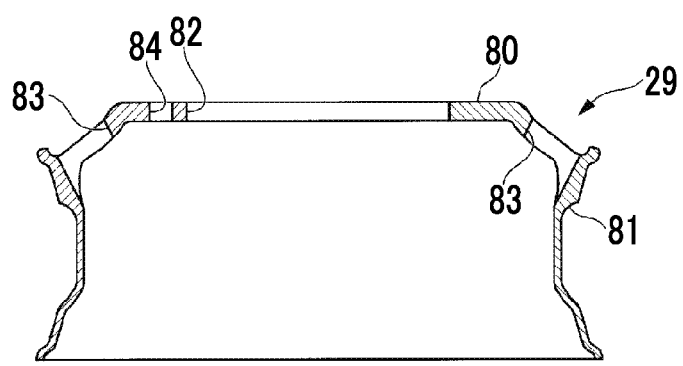
FIG. 4B is a view illustrating the wheel in the vehicle related to the first embodiment of the invention, and is a view illustrating section C-C of FIG. 4A.

As illustrated in FIGS. 4A and 4B, the wheel 29 has a center disk 80 that has a disk shape located on the outermost side in the width direction, a rim 81 that has a tubular shape formed so as to extend from an end edge of the center disk 80 on an outer side in a radial direction to the inner side in the width direction, and a wheel hub 28 that fixes the axle shaft 12 and the wheel 29 via the axle hub 27.

A central part of the center disk 80 coincides with the rotational axis O, and an insertion hole 82 centered on the rotational axis O is formed at this central part. Moreover, a plurality of bolt attachment holes 84 are formed at positions on the further outer side in the radial direction than the insertion hole 82 on the circumference centered on the rotational axis O, in the center disk 80.

A plurality of decorative holes 83 are formed at positions on the further outer side in the radial direction of the rotational axis O than the bolt attachment holes 84, on the circumference centered on the rotational axis O, as ventilation holes for allowing the inside and outside of the wheel 29 to communicate with each other, in the center disk 80.

The decorative holes 83 are provided in order to reduce the weight of the wheel 29 and improve the ventilation performance between the inside and outside of the wheel 29 in the width direction. In the present embodiment, the decorative holes 83 are formed at end positions on the outer side in the radial direction of the rotational axis O. Moreover, the respective decorative holes 83 are formed so as to be inclined from the outer side toward the inner side in the radial direction of the rotational axis O as they become closer to the inner side in the width direction from the outer side in the width direction.

In the present embodiment, the center disk 80 has a shape that is chamfered at an end edge on the outer side in the radial direction. Accordingly, the openings of the decorative holes 83 on the outer side in the width direction are inclined with respect to the rotational axis O, and open toward the outer side in the radial direction.

The wheel hub 28 is attached to an end of the axle hub 27 on the outer side in the width direction, is inserted into the insertion hole 82 of the center disk 80, and is fixed to the center disk 80 by bolts 85 (referring to FIG. 2) being inserted through the bolt attachment holes 84 of the center disk 80.

Here, the tip of the wheel hub 28 is brought into a state where the tip protrudes to the outer side in the width direction from the center disk 80 in a state where the wheel hub 28 is inserted into the insertion hole 82.

(Brake Device)

As illustrated in FIGS. 1 and 2, the brake device 17 is disposed inside the rim 81 in the wheel 29, that is, further to the inner side in the width direction than the center disk 80. The brake device 17 has a brake disk 90 that is fixed to the wheel hub 28 of the wheel 29, and a brake caliper 91 including brake pads (not illustrated) capable of sandwiching the brake disk 90 from both sides in the rotational axis O.

That is, the brake device 17 of the present embodiment is a disc brake. The above brake pads in the brake caliper 91 are able to sandwich the brake disk 90 with hydraulic pressure or pneumatic pressure, thereby applying a braking force to the running wheel 13.

(Cooling Device)

The cooling device 18 includes a plate-like member 95 that is provided at an outer end of the wheel hub 28 that protrudes from the center disk 80 of the wheel 29 to the outer side in the width direction, and a cooling fin 96 that is formed on the plate-like member 95 and produces an airflow AR passing through the brake device 17 through the decorative holes 83.

As illustrated in FIGS. 1, 2, 5A, and 5B, the plate-like member 95 is formed in the shape of a disk, and is fixed to the wheel hub 28 in a state where the center thereof is aligned with the rotational axis O. That is, bolt attachment holes 98 are formed on the circumference centered on the rotational axis O in the plate-like member 95. The plate-like member 95 is fixed to the wheel hub 28 by bolts 99 (referring to FIG. 2) being inserted through the bolt attachment holes 98.

In the present embodiment, an annular protruding part 95a that protrudes annularly and outward is formed in a region closer to the outer side in the radial direction of the rotational axis O than the positions where the bolt attachment holes 98 are formed so that the plate-like member 95 does not interfere with bolt heads of the bolts 85 at the time of fixing the center disk 80 of the wheel 29 and the wheel hub 28, when the plate-like member 95 is attached to the wheel hub 28.

A plurality of the cooling fins 96 are formed apart from each other at equal intervals in the circumferential direction on the circumference centered on the rotational axis O, on the annular protruding part 95a of the plate-like member 95.

Each cooling fin 96 is formed toward the outer side in the width direction from on the annular protruding part 95a. More specifically, the cooling fin extends so as to be inclined toward one side (a counterclockwise direction side toward the paper surface of FIG. 5A and a white arrow direction) in the circumferential direction of the rotational axis O as it becomes closer to a side apart from the axle shaft 12 in the direction of the rotational axis O.

A through-hole 97 passing through the annular protruding part 95a in the direction of the rotational axis O is formed in a region on the annular protruding part 95a corresponding to a region where the cooling fin 96 is provided on the side toward which the cooling fin 96 is inclined.

The cooling fins 96 and the through-holes 97 are formed at positions corresponding to radial positions where the decorative holes 83 are formed in the center disk 80 of the wheel 29. Accordingly, when the plate-like member 95 rotates in both forward and reverse directions together with the wheel 29, the airflow AR in a direction along the rotational axis O is produced by whether external air is sucked or discharged through the decorative holes 83.

Here, in the present embodiment, the cooling fins 96, and the through-holes 97 corresponding to the cooling fins 96, respectively, are integrally formed. That is, a notch equivalent to two sides L1 and L2 that sandwich a vertex P of a triangular shape where the vertex P is located on one side in the circumferential direction of the rotational axis O as seen from the direction of the rotational axis O is formed in the annular protruding part 95a. Thereafter, each through-hole 97, and each cooling fin 96 that forms a triangular shape are formed by lifting the vertex P and the two sides L1, and L2 from the surface of the annular protruding part 95a.

The cooling fin 96 and the through-hole 97 may be separately formed, and, the shapes thereof are not limited to the case of the present embodiment.

According to such a vehicle 1, even if the wheel 29 of the running wheel 13 rotates in any direction with the traveling of the vehicle 1, it is possible to produce the airflow AR passing through the brake device 17 inside the rim 81 of the wheel 29 with the cooling fins 96 of the cooling device 18.

Figure 5A:
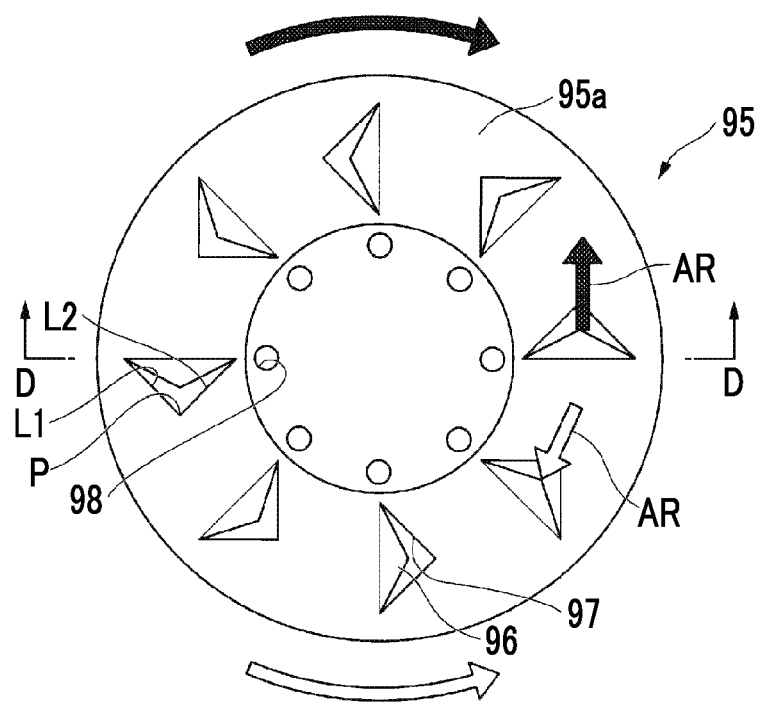
FIG. 5A is a view illustrating a cooling device in the vehicle related to the first embodiment of the invention, and is a view as seen from the outer side in the width direction in the direction of the rotational axis.
Figure 5B:
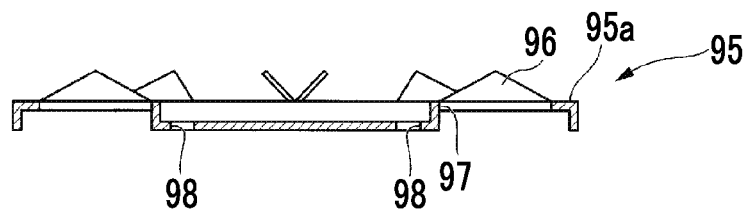
FIG. 5B is a view illustrating the cooling device in the vehicle related to the first embodiment of the invention, and is a view illustrating section D-D of FIG. 5A.

More specifically, the cooling fins 96 extend so as to be inclined toward one side in the circumferential direction of the rotational axis O on the plate-like member 95. For this reason, in a case where the rotational direction of the wheel 29 coincides with one side in the circumferential direction, that is, in a case where the white arrow direction of FIG. 5A is the rotational direction, the airflow AR is produced in the white arrow direction that faces the through-holes 97. Accordingly, the airflow AR that faces the inside of the wheel 29 from the outside thereof is produced in the wheel 29.

On the other hand, in a case where the rotational direction of the wheel 29 coincides with the other side in the circumferential direction, that is, in a case where a thick arrow direction of FIG. 5A is the rotational direction, the airflow AR is produced in the thick arrow direction that faces the outside of the plate-like member 95 from the through-holes 97. Accordingly, the airflow AR that faces the outside of the wheel 29 from the inside thereof is produced in the wheel 29.

Therefore, even in a case where the rotational direction of the wheel 29 is any one of the forward and reverse directions, it is possible to produce the airflow AR passing through the brake device 17. Hence, in the vehicle 1 of the present embodiment which is provided with the running wheel 13 having such a wheel 29 and travels, the cooling of the brake device 17 becomes possible even in a case where the vehicle travels after the traveling direction is changed.

By cooling the brake device 17 in this way, the amount of heat transfer by which the heat from the brake device 17 is transferred to the rubber tire 30 through the wheel 29 can be reduced, and the lifespan of the rubber tire 30 can be restrained from being shortened.

Since generation of a crack in the brake disk 90 by thermal stress generation can be suppressed by cooling of the brake disk 90, an improvement in the durability of the brake device 17 becomes possible. Since overheating of brake oil can be suppressed in a case where a hydraulic brake is used, it is possible to suppress the occurrence of vapor lock.

By virtue of the cooling of the brake caliper 91, the lifespan of the brake pads provided in the brake caliper 91 can be prolonged.

Additionally, the amount of heat transfer by which the heat of the brake device 17 is transmitted to the wheel hub 28 can be reduced, and the seizure of a bearing or the like (not illustrated) that supports the running wheel 13 can be suppressed, and the rotation performance of the running wheel 13 can be maintained.

Additionally, a regeneration brake is provided in the vehicle 1 as an apparatus that applies a braking force to the running wheel 13. In this case, since traveling is possible without impairing brake performance by using the brake device 17 even after regeneration invalidation has occurred, high-speed traveling becomes continuously possible. Hence, reliability is improved without interference with steady operation.

The cooling fins 96 are provided so that the airflow AR in the direction along the rotational axis O of the axle shaft 12 is produced. For this reason, the airflow AR can be directly blown to the brake device 17, and the cooling effect of the brake device 17 can be improved. Additionally, by virtue of such an airflow AR, the airflow AR after the heat generated from the brake device 17 is recovered is rapidly circulated in a direction apart from the wheel 29, and efficient heat exhaust becomes possible.

As the plate-like member 95 in which the cooling fins 96 are formed is attached to the wheel hub 28, the cooling fins 96 can be easily provided in the wheel 29.

The airflow AR can be produced by the cooling fins 96 through the decorative holes 83 formed in advance in the wheel 29 for the purpose of weight reduction and the ventilation between the inside and outside of the wheel 29. Hence, it becomes unnecessary to newly form ventilation holes for allowing the inside and outside of wheel 29 to communicate with each other in order to produce the airflow AR that faces the inside and outside of the wheel 29. As a result, costs for newly forming the ventilation holes can be reduced.

According to the vehicle 1 of the present embodiment, it is possible to cool the brake device 17 housed in the wheel 29 with the cooling fins 96 of the cooling device 18 irrespective of the traveling direction of the vehicle 1 to maintain brake performance.

The plate-like member 95 may not be disk-like. Additionally, the annular protruding part 95a in the plate-like member 95 may not necessarily be formed depending on a positional relationship with the bolts 85.

Second Embodiment

Next, a vehicle 1A related to a second embodiment of the invention will be described.

The same constituent elements as those of the first embodiment will be designated by the same reference numerals, and detailed description thereof will be omitted.

In the vehicle of the present embodiment, a steering bogie 2A is different from that of the first embodiment.

Figure 6:
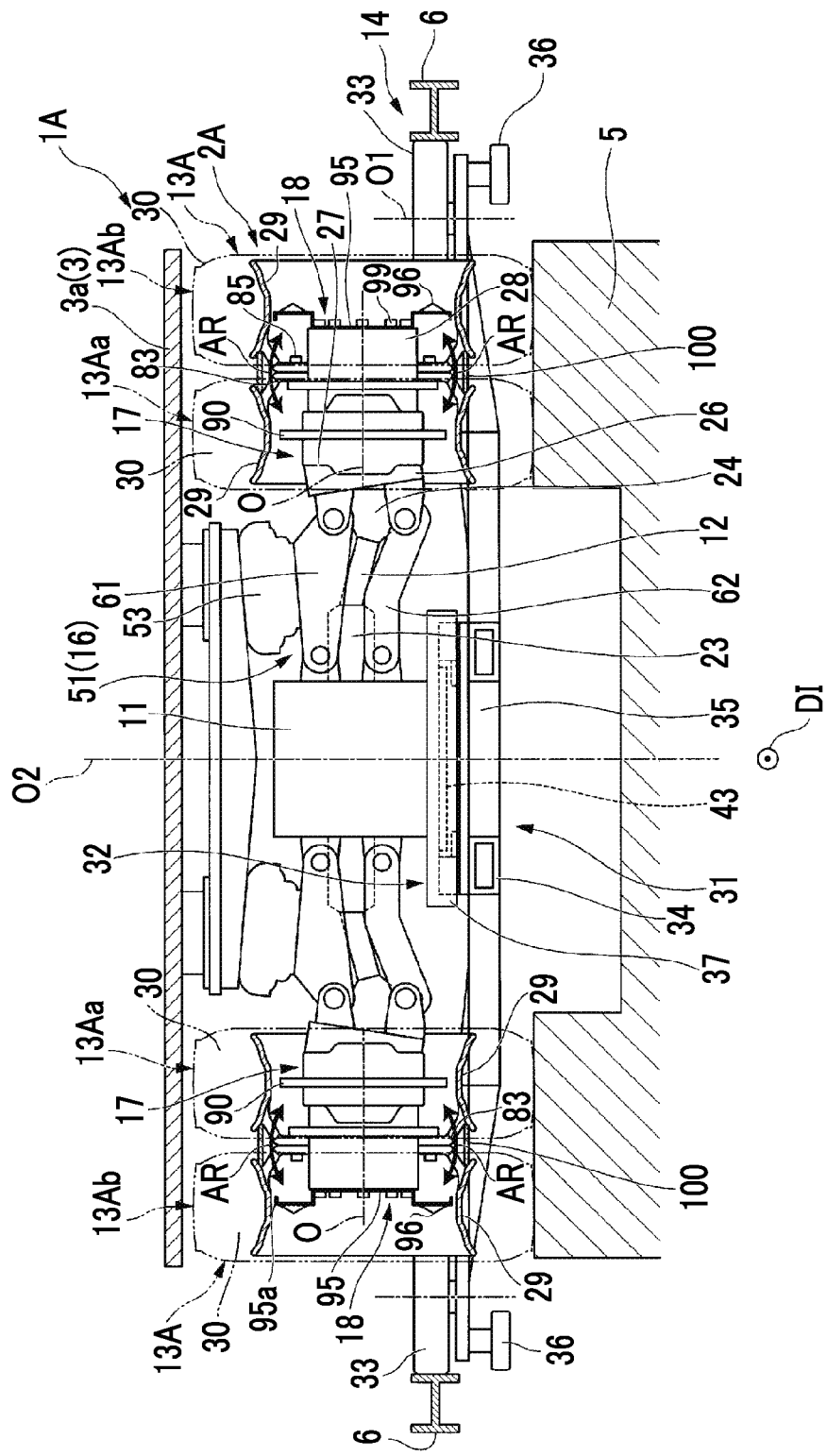
FIG. 6 is a front view illustrating a steering bogie of a vehicle related to a second embodiment of the invention, and is a view equivalent to the view as seen in the direction of arrow A of FIG. 1.

As illustrated in FIG. 6, the steering bogie 2A includes running wheels 13A of which two are coupled to an end of each axle shaft 12 via the axle hubs 27. That is, the steering bogie 2A with dual tires is used in the present embodiment.

A running wheel 13A located on the inner side in the width direction among the running wheels 13A coupled to each axle shaft 12 is defined as an inner wheel 13Aa, and a running wheel located on the outer side in the width direction is defined as an outer wheel 13Ab.

The inner wheel 13Aa has the same configuration as the running wheel 13 of the first embodiment.

Although the outer wheel 13Ab is the same as the inner wheel 13Aa, the outer wheel 13Ab is fixed to the inner wheel 13Aa in a state in which the center disk 80 of the outer wheel 13Ab is butted against the center disk 80 of the inner wheel 13Aa by arranging the inner wheel 13Aa such that the inside and outside of the inner wheel 13Aa in the width direction are reversed. Accordingly, the decorative holes 83 in the inner wheel 13Aa and the decorative holes 83 in the outer wheel 13Ab are arranged to face each other in the direction of the rotational axis O, that is, the width direction.

Moreover, the steering bogie 2A includes a wind guide member 100 that is arranged between the cooling fins 96 and the decorative holes 83 and guides the airflow AR from the cooling fins 96, to the decorative holes 83.

Figure 7A:
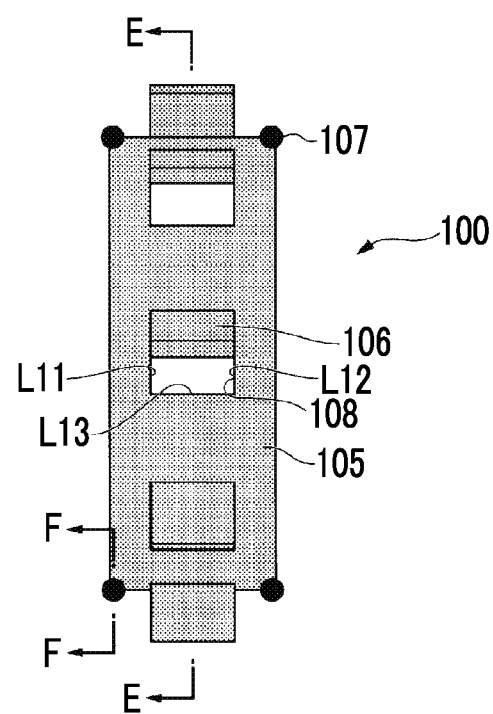
FIG. 7A is a view illustrating a wind guide member in the vehicle related to the second embodiment of the invention, and is a view as seen from an outer side in a radial direction of the rotational axis.
Figure 7B:
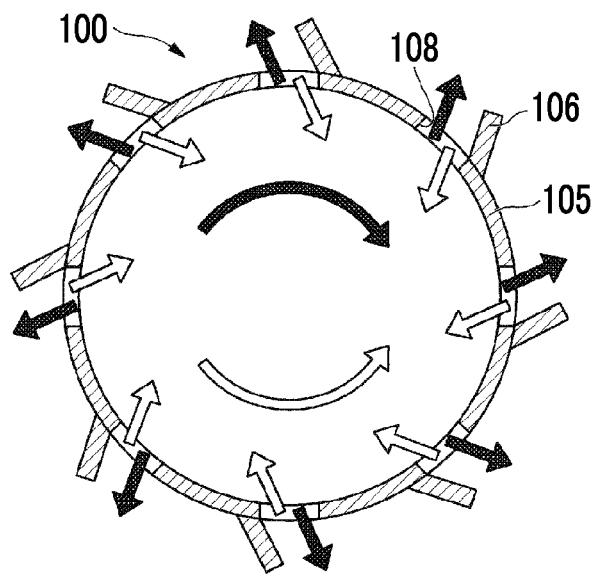
FIG. 7B is a view illustrating the wind guide member in the vehicle related to the second embodiment of the invention, and is a view illustrating section E-E of FIG. 7A.

As illustrated in FIGS. 7A and 7B, the wind guide member 100 has a body part 105 that has a tubular shape centered on the rotational axis O, and wind guide member fins 106 that are formed on an outer peripheral surface of the body part 105.

The body part 105 is a member that is chamfered on the outer side in the radial direction in the center disk 80 of the inner wheel 13Aa and the center disk 80 of the outer wheel 13Ab and has a tubular shape centered on the rotational axis O provided in the wheel 29 so as to be sandwiched between center disks 80.

The body part 105 has an internal diameter dimension such that an inner peripheral surface thereof is located nearer to the outer side in the radial direction than the radial positions where the decorative holes 83 are formed, and covers the decorative holes 83 from the outer side in the radial direction of the rotational axis O.

Rubber members 107 are provided at the positions of both ends of the body part 105 in the direction of the rotational axis O. When the body part 105 is sandwiched between the inner wheel 13Aa and the outer wheel 13Ab, slip-out of the body part 105 from the wheel 29 is restricted by the rubber members 107.

The rubber members 107 fill a gap of matching parts between the wheel 29 and the body part 105, suppress leakage of the airflow AR, and allow an efficient flow.

Figure 7C:
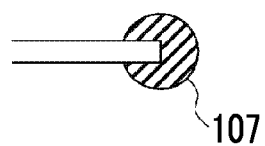
FIG. 7C is a view illustrating the wind guide member in the vehicle related to the second embodiment of the invention, and is a view illustrating section F-F.
Figure 7D:
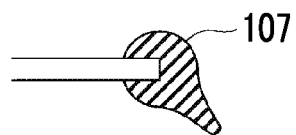
FIG. 7D is a view illustrating the wind guide member in the vehicle related to the second embodiment of the invention, and is a view illustrating section F-F.
Figure 7E:
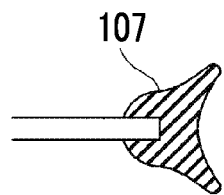
FIG. 7E is a view illustrating the wind guide member in the vehicle related to the second embodiment of the invention, and is a view illustrating section F-F.

As the rubber members 107, those having various shapes corresponding to differences in the shape of the wheel 29 (shapes vary depending on makers) can be selected. For example, rubber members in which a sectional shape illustrated in FIG. 7C is a circular shape, rubber members in which a sectional shape illustrated in FIG. 7D is a single-sided lip shape, and rubber members in which a sectional shape illustrated in FIG. 7E is a double-sided lip shape may be used.

A plurality of the wind guide member fins 106 are formed apart from each other at equal intervals in the circumferential direction of the rotational axis O on the outer peripheral surface of the body part 105. More specifically, each wind guide member fin 106 extends so as to be inclined toward one side (a counterclockwise direction toward the paper surface of FIG. 7B and a white arrow direction) in the circumferential direction of the rotational axis O as it becomes closer to the outer side in the radial direction of the rotational axis O.

A through-hole 108 passing through the body part 105 is formed in a region on the outer peripheral surface of the body part 105 corresponding to a region where the wind guide member fin 106 is provided on the side toward which the wind guide member fin 106 is inclined.

In the present embodiment, the wind guide member fins 106, and the through-holes 108 corresponding to the wind guide member fins 106, respectively, are integrally formed. That is, a notch consisting of two sides L11 and L12 extending in the circumferential direction in a quadrangular shape extending to one side in the circumferential direction of the rotational axis O as seen from the outer side in the radial direction of the rotational axis O and one side L13 connecting these two sides L11 and L12 on one side in the circumferential direction is formed in the body part 105. Thereafter, the through-hole 108, and the wind guide member fin 106 having a quadrangular shape are formed by lifting these three sides radially outward.

The wind guide member fin 106 and the through-hole 108 may be separately formed, and, the shapes thereof are not limited to the case of the present embodiment.

According to the vehicle 1A of the present embodiment, when the airflow AR that faces from the outside of the outer wheel 13Ab in the width direction to the inside of the inner wheel 13Aa in the width direction is produced by the cooling fins 96, the wind guide member 100 can guide the airflow AR so that the airflow does not become a flow that faces the outside of the wheel 29 before the airflow AR is guided to the brake device 17.

When the airflow AR that faces from the inside of inner wheel 13Aa in the width direction to the outside of the outer wheel 13Ab in the width direction is produced by the cooling fins 96, the wind guide member 100 guides the airflow AR passing through the brake device 17, so that the brake device 17 can be cooled by the airflow AR, and the airflow AR can be passed from the wheel 29 of the inner wheel 13Aa to the wheel 29 of the outer wheel 13Ab. For this reason, cooling of the entire running wheel 13A becomes possible and efficient cooling of the brake device 17 and the running wheel 13A becomes possible by the airflow AR resulting from the cooling fins 96.

By virtue of the wind guide member 100 having a tubular shape, the wind guide member 100 can be easily installed to the wheel 29.

When the wind guide member 100 rotates in both forward and reverse directions together with the wheel 29, the airflow AR in the radial direction of the rotational axis O can be produced by the wind guide member fins 106 by whether external air is sucked or discharged from the through-holes 108.

More specifically, the wind guide member fins 106 extend so as to be inclined toward one side in the circumferential direction of the rotational axis O on the body part 105. For this reason, in a case where the rotational direction of the wheel 29 coincides with one side in the circumferential direction, that is, in a case where the white arrow direction of FIG. 7B is the rotational direction, the airflow AR is produced in the white arrow direction that faces the through-holes 108. Accordingly, the airflow AR that faces the inside of the wheel 29 from the outside thereof is produced in the wheel 29.

On the other hand, in a case where the rotational direction of the wheel 29 coincides with the other side in the circumferential direction, that is, in a case where a thick arrow direction of FIG. 7B is the rotational direction, the airflow AR is produced in the thick arrow direction that faces the outside of the body part 105 from the through-holes 108. Accordingly, the airflow AR that faces the outside of the wheel 29 from the inside thereof is produced in the wheel 29.

Therefore, even in a case where the rotational direction of the wheel 29 is any one of forward and reverse directions, not only the airflow AR resulting from the cooling fins 96 can be guided by the body part 105, but also more airflow AR can be made to pass through the brake device 17 by generating the airflow AR in the radial direction with the wind guide member fins 106. Therefore, more efficient cooling of the brake device 17 becomes possible.

The wind guide member fins 106 and the through-hole 108 may not be necessarily provided in the wind guide member 100.

Third Embodiment

Next, a vehicle 1B related to a third embodiment of the invention will be described.

In addition, the same constituent elements as those of the first and second embodiments will be designated by the same reference numerals, and detailed description thereof will be omitted.

The vehicle 1B of the present embodiment is different from the second embodiment in terms of a wind guide member 110 of a steering bogie 2B with the second embodiment as a basic configuration.

Figure 8:
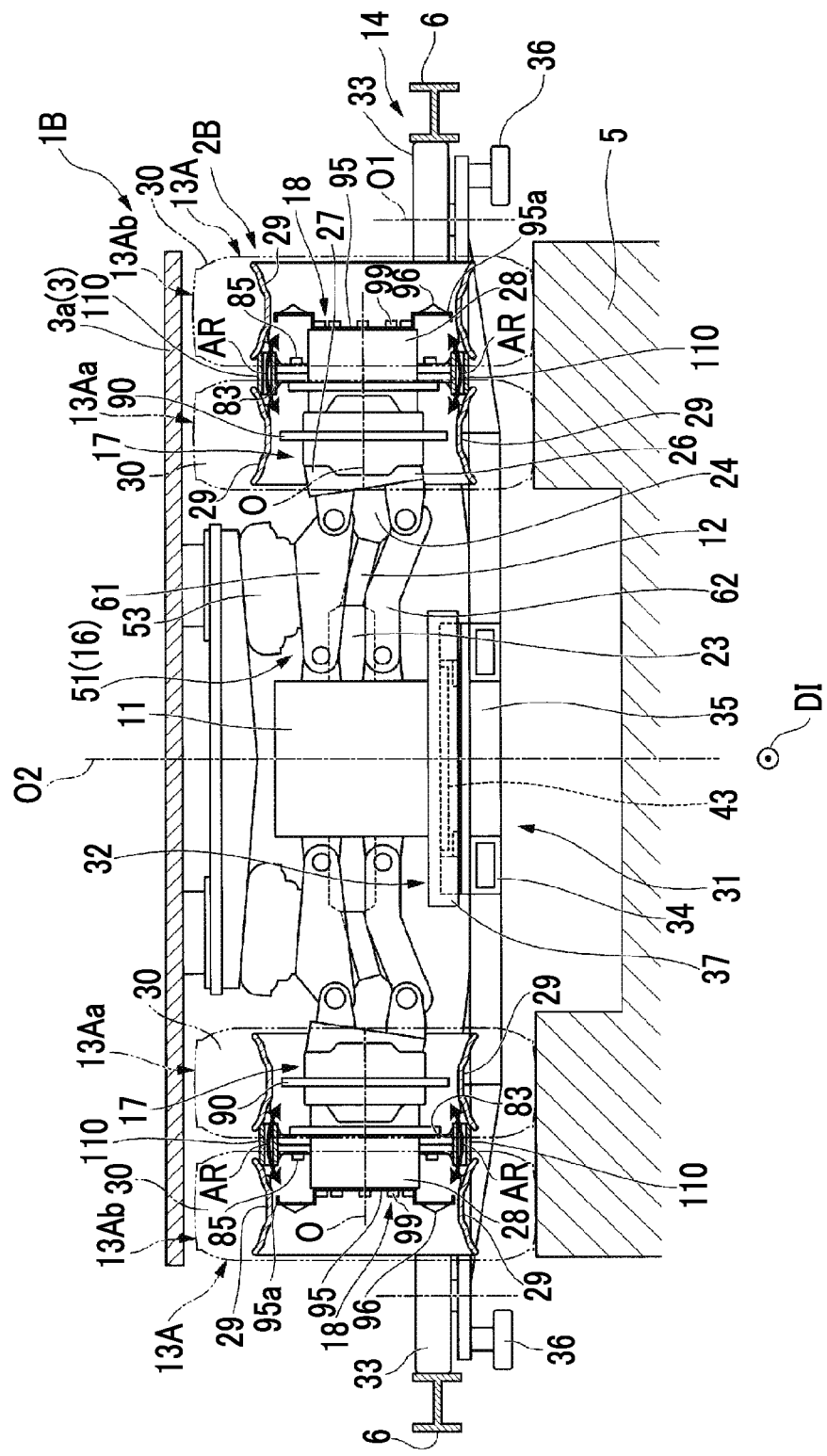
FIG. 8 is a front view illustrating a steering bogie of a vehicle related to a third embodiment of the invention, and is a view equivalent to the view as seen in the direction of arrow A of FIG. 1.

As illustrated in FIG. 8, the wind guide member 110 has a tubular shape that surrounds the openings of the respective decorative holes 83 from an outer peripheral side thereof. The wind guide member 110 is provided so as to be sandwiched between the decorative holes 83 in the inner wheel 13Aa, and the decorative holes 83 in the outer wheel 13Ab, which face each other in the direction of the rotational axis O.

The same members (not illustrated) as the rubber members 107 are provided at the positions of both ends of the wind guide member 110 in the direction of the rotational axis O, and when the wind guide member 110 is sandwiched between the inner wheel 13Aa and the outer wheel 13Ab, slip-out from the wheel 29 is restricted by the rubber members.

According to the vehicle 1B of the present embodiment, by using the tubular member that surrounds the openings of the respective decorative holes 83 from outer peripheral side as the wind guide member 110, the cross-sectional area of a flow passage for the airflow AR can be made small when the airflow AR produced by the cooling fins 96 flows through the wind guide member 110. Therefore, the flow speed of the airflow AR that flows through the wind guide member 110 becomes large, and consequently, the effect of dissipating the heat from the brake device 17 by the airflow AR passing through the brake device 17 can be improved.

Although the embodiments of the invention have been described above in detail, some design changes can also be made without departing from the technical idea of the invention.

For example, the cooling fins 96 of the cooling devices 18 may be formed so that directions in which the cooling fins extend become the same circumferential direction in the left and right running wheels 13 on both sides of the subframe 11. That is, for example, the cooling fins 96 in all the running wheels 13 (13A) are formed so as to extend in the rolling direction of the running wheels 13 (13A) at the time of the traveling of the vehicle 1 (1A, 1B), or a direction opposite to the rolling direction.

In this case, an airflow AR that faces the inner side in the width direction that becomes a direction that faces each axle shaft 12 from each wheel 29, or an airflow AR that faces the outer side in the width direction that becomes a direction that faces each wheel 29 from each axle shaft 12 is produced from the cooling fins 96 that are provided in the respective wheels 29 in the pair of left and right running wheels 13 (13A).

Therefore, by providing the cooling devices 18 in the pair of left and right wheels 29, respectively, the airflows AR produced by the cooling fins 96 in the wheels 29 of the pair of left and right running wheels 13 (13A) flow so as to approach each other or so as to separate from each other. As a result, the forces of the airflows AR produced in the pair of left and right wheels can be cancelled off each other, and thus the influence of the airflows AR on the traveling of the steering bogies 2 (2A, 2B) can be reduced.

The cooling fins 96 of the cooling devices 18 may be formed so that the directions in which the cooling fins extend become different directions in the circumferential direction in the left and right running wheels 13 on both sides of the subframe 11. Namely, for example, the cooling fins 96 in the left running wheel 13 (13A) extend in the rolling direction of the running wheels 13 (13A) at the time of the traveling of the vehicle 1 (1A, 1B), and the cooling fins 96 in the right running wheel 13 (13A) extend in the direction opposite to the rolling direction of the running wheels 13 (13A) at the time of the traveling of the vehicle 1 (1A, 1B).

In this case, airflows AR that face one side (for example from the left to the right) of the rotational axis O of the axle shaft 12 are produced by the cooling fins 96 provided in the respective wheels 29 in the pair of left and right running wheels 13 (13A). Therefore, the airflows AR flow toward the same direction along the rotational axis O in all the wheels 29.

Therefore, the airflows AR produced in the pair of left and right running wheels 13 (13A) can be kept from interfering with each other, and the airflows AR smoothly passing through the brake devices 17 can be produced.

The invention is not limited to the above-described case, and the direction in which the cooling fins 96 of the cooling device 18 extend can be appropriately selected in each running wheel 13 (13A).

In the above-described embodiments, although the cooling device 18 is formed separately from the wheel 29, the cooling device may be formed integrally with the wheel 29.

Although the airflow AR in the direction along the rotational axis O of the axle shaft 12 is produced by the cooling fins 96, it is sufficient if at least an airflow AR passing through the brake device 17 through the decorative holes 83 is produced, and the airflow AR may not be necessarily produced in the direction along the rotational axis O.

Although the airflow AR resulting from the cooling fins 96 is made to pass through the inside and outside of the wheel 29 using the decorative holes 83, ventilation holes for allowing the inside and outside of the wheel 29 to communicate with each other may be separately formed in the wheel 29 instead of the decorative holes 83.

Although the example of dual tires has been described in the second embodiment and the third embodiment, the wind guide member 100 (110) in these embodiments are applicable to even a single tire or the like, and the number of tires is not limited. In the case of the single tire, it is possible to provide the wind guide member 100 (110) between the cooling fins 96 and the decorative holes 83 to guide the airflow AR from the cooling fins 96, to the brake disk 90.

The invention is not limited to a case where the brake device 17 is the disc brake, and the cooling device 18 is applied to, for example, even a case where a drum brake is provided, and thus brake cooling is possible.

The materials of the plate-like member 95, the cooling fins 96, the wind guide member 100 (110), and the wind guide member fins 106 may be metallic materials, such as a steel material and an aluminum material, or may be non-metal materials, such as resin, such as fiber-reinforced plastic, and hard rubber. In cases where the metallic materials are used for the plate-like member 95, the cooling fins 96, the wind guide member 100 (110), and the wind guide member fins 106, a rubber member may be used for a portion coming into contact with the wheel 29 or the wheel hub 28 as a shock absorbing material.

The vehicles 1 (1A, 1B) may be vehicles of a center guide rail type (center guide type) transportation system in which the guide rail running in the extending direction of the track 5 is provided on the central position of the track 5 in the width direction.

Additionally, in the above-described embodiments, the steering bogies 2 (2A, 2B) are described as being steering carriages. However, the steering bogies may be ordinary bogie trucks that are not steered, and are not limited to the case of the above-described embodiments.

INDUSTRIAL APPLICABILITY

According to the above cooling device, steering bogie, and vehicle, it is possible to cool the brake device housed in the wheel with the cooling fins of the cooling device irrespective of the traveling direction to maintain brake performance.

REFERENCE SIGNS LIST

1: VEHICLE
2: STEERING BOGIE
3: CAR BODY
3a: UNDERFRAME
5: TRACK
6: GUIDE RAIL
11: SUBFRAME
12: AXLE SHAFT
13: RUNNING WHEEL
14: STEERING GUIDE DEVICE
15: STEERING MECHANISM
16: SUSPENSION DEVICE
17: BRAKE DEVICE
18: COOLING DEVICE
23: JOINT
24: JOINT
26: KINGPIN
27: AXLE HUB
28: WHEEL HUB
29: WHEEL
30: RUBBER TIRE
31: GUIDE FRAME
32: GUIDE-FRAME SUPPORT MECHANISM
33: GUIDE WHEEL
34: LONGITUDINAL BEAM
35: CROSS BEAM
41: STEERING ARM
42: STEERING ROD
43: TURNING BEARING
51: PRIMARY SUSPENSION MECHANISM
52: SECONDARY SUSPENSION MECHANISM
53: AIR SPRING
61: UPPER ARM
62: LOWER ARM
71: UPPER LINK
72: LOWER LINK
73: SUSPENSION FRAME
80: CENTER DISK
81: RIM
82: INSERTION HOLE
83: DECORATIVE HOLE
84: BOLT ATTACHMENT HOLE
85: BOLT
90: BRAKE DISK
91: BRAKE CALIPER
95: PLATE-LIKE MEMBER
95a: ANNULAR PROTRUDING PART
96: COOLING FIN
97: THROUGH-HOLE
98: BOLT ATTACHMENT HOLE
99: BOLT
AR: AIRFLOW
L1, L2: SIDE
O1: ROTATION AXIS
O2: TURNING AXIS
O: ROTATIONAL AXIS
P: VERTEX
1A: VEHICLE
2A: STEERING BOGIE
13A: RUNNING WHEEL
13Aa: INNER WHEEL
13Ab: OUTER WHEEL
100: WIND GUIDE MEMBER
105: BODY PART
106: WIND GUIDE MEMBER FIN
107: RUBBER MEMBER
108: THROUGH-HOLE
L11, L12, L13: SIDE
1B: VEHICLE
2B: STEERING BOGIE
110: WIND GUIDE MEMBER

The invention claimed is:

1. A cooling device comprising:
a plurality of cooling fins provided in a wheel of a running wheel having a brake device disposed therein and rotating integrally with an axle shaft and that are configured to produce an airflow passing through the brake device through a ventilation hole for allowing an inside and outside of the wheel to communicate with each other by the rotation of the wheel in both forward and reverse directions; and
a plate-like member that is provided at an end apart from the axle shaft, in a wheel hub that fixes the axle shaft and the wheel, and rotates together with the axle shaft,
wherein each cooling fin is formed in the plate-like member,
the plurality of the cooling fins is formed on a circumference centered on a rotational axis of the axle shaft on the plate-like member, and
each of the cooling fins extends so as to be inclined toward one side in a circumferential direction of the rotational axis as it becomes closer to a side apart from the axle shaft in the direction of the rotational axis from on the plate-like member, and a through-hole passing through the plate-like member is formed in a region on the plate-like member corresponding to a region where each cooling fin is provided on a side toward which each cooling fin is inclined.

2. The cooling device according to claim 1, wherein each cooling fin produces the airflow through a plurality of decorative holes that serve as the ventilation hole and are formed on the circumference centered on a rotational axis of the axle shaft in the wheel.

3. The cooling device according to claim 1, wherein each cooling fin produces the airflow in a direction along the rotational axis of the axle shaft.

4. The cooling device according to claim 1, further comprising:
a wind guide member that is provided in the wheel, rotates integrally with the wheel, and guides the airflow from each cooling fin, to the ventilation hole.

5. The cooling device according to claim 4, wherein the wind guide member has a tubular shape that covers the ventilation hole from an outer side in a radial direction of the rotational axis of the axle shaft and is centered on the rotational axis.

6. The cooling device according to claim 5, wherein the wind guide member includes
 a body part having a tubular shape centered on the rotational axis of the axle shaft, and
 a wind guide member fin that extends so as to be inclined toward one side in the circumferential direction of the rotational axis as it becomes closer to an outer side in the radial direction of the rotational axis of the axle shaft from an outer peripheral surface of the body part, and
 wherein a through-hole passing through the body part is formed in a region on the outer peripheral surface of the body part corresponding to a region where the wind guide member fin is provided on a side toward which the wind guide member fin is inclined.

7. The cooling device according to claim 4, wherein the wind guide member has a tubular shape that surrounds an opening of the ventilation hole from an outer peripheral side thereof.

8. The cooling device according to claim 4, wherein a rubber member is provided between the wind guide member and the wheel located at an end of the wind guide member in the direction of the rotational axis.

9. A steering bogie comprising:
 the axle shaft that rotates with a rotational axis as a center;
 a pair of left and right of running wheels each having a wheel and rotating integrally with the axle shaft;
 a steering guide device that supports the pair of running wheels and is guided by a guide rail extending along a track; and
 the cooling device according to claim 1 provided in each wheel.

10. The steering bogie according to claim 9, wherein the cooling fins are provided in the cooling devices provided in the respective wheels in the pair of running wheels so as to produce airflows that face the axle shaft from each wheel in both the cooling devices or produce airflows that face the wheel from the axle shaft in both the cooling devices.

11. The steering bogie according to claim 9, wherein the cooling fins are provided in the cooling devices provided in the respective wheels in the pair of running wheels so as to produce airflows that face one side in the direction of the rotational axis of the axle shaft in both the cooling devices.

12. A vehicle comprising:
 a car body having a space formed therein; and
 the steering bogie according to claim 9 that is provided in a lower part of the car body.

\* \* \* \* \*